United States Patent Office 2,773,767

Patented Dec. 11, 1956

2,773,767

LIGHT SENSITIVE MATERIAL

Martha Tomanek and Wilhelm Neugebauer, Wiesbaden-Biebrich, Germany, assignors, by mesne assignments, to Azoplate Corporation, Summit, N. J., a corporation of New Jersey No Drawing. Application April 14, 1952, Serial No. 282,266

Claims priority, application Germany April 17, 1951

15 Claims. (Cl. 96—33)

The present invention relates to light sensitive material for use in the lithographic art and to the method of using such material in that art. More particularly, it relates to light sensitive material suitable for photomechanical reproduction and to methods of manufacturing lithographic printing plates from this material.

There is a recent tendency to produce the light sensitive material required for photomechanical reproduction processes without using light hardenable colloid substances in the light sensitive layer as has been customary for a long time. In the case of light sensitive material produced without colloids it is essential that either the light sensitive substance itself or the transformation products resulting from exposure to light should be greasy ink-receptive and retain the ink for an adequate length of time under the conditions of the printing operation.

It has now been found that the derivatives of acenaphthene conforming to either one of the following general formulae

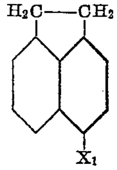

or

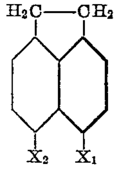

in which $X_1$ and $X_2$ may stand for halogen, nitro, alkoxy, acylated amino and acylated hydroxyl groups or the acyl residues of the general formula —CO—R in which R stands for an aromatic radical, an alkyl radical, an alkylene radical or an aromatically substituted alkyl or alkylene radical can very advantageously be used to form a sensitive layer on material for the production of printing plates by photomechanical methods. The use of hardenable colloids in combination with said acenaphthene derivatives is unnecessary.

The procedure to be followed in producing a printing plate according to the present invention consists in exposing the light sensitive material sensitized by means of a derivative of acenaphthene to a light image (by contact oa by projection) under a master pattern and developing the exposed material by treating it with dilute acid. This treatment removes either the light decomposition products of the acenaphthene derivative or the compound itself, as more fully explained hereinafter in the examples. The printing plate thus obtained may then be inked with greasy ink in the presence of water, either by hand or on the printing machine. The portion of the acenaphthene derivative or its light decomposition products which remain on the plate to accept greasy ink are hereinafter referred to as the "printing image."

Examples of the acenaphthene derivatives to be used in accordance with this invention are listed below:

(1)

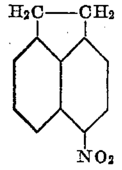

5-nitro-acenaphthene (F=101°–102° C.), described by Sachs and Mosebach, "Berichte der Deutschen Chemischen Gesellschaft," 44th annual publication (1911), page 2854.

(2)

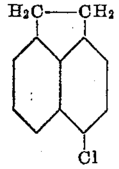

5-chloro-acenaphthene (F=70.5° C.), described by Crompton and Walker, "Journal of the Chemical Society," London (1912), volume 101, page 959.

(3)

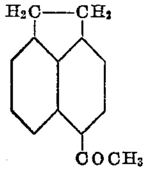

5-acetyl-acenaphthene (F=75° C., B. P.=361° C.), described by Graebe and Guinsbourg, "Annalen der Chemie," volume 327 (1903), pages 91–92.

(4)

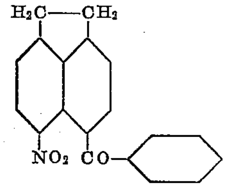

5-benzoyl-acenaphthene (F=100°–101° C.), described by Dziewonski and Rychlik, "Berichte der Deutschen Chemischen Gesellschaft," 58th annual publication (1925), page 2241.

(5)

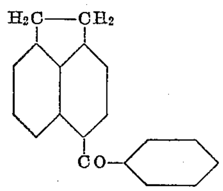

6-nitro - 5 - benzoyl-acenaphthene (F=169°–171° C.), described by Dziewonski and Rychlik, "Berichte der Deutschen Chemischen Gesellschaft," 58th annual publication (1925), page 2248.

(6)

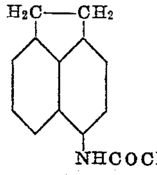

5-acetyl-amino-acenaphthene (F=192° C.), described by Sachs and Mosebach, "Berichte der Deutschen Chemischen Gesellschaft," 44th annular publication (1911), page 2856.

(7)

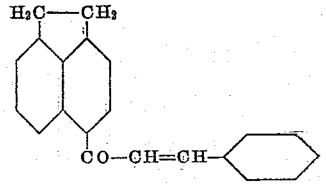

5-cinnamoyl-acenaphthene (F=102°–103° C.), obtainable from 5-acetyl-acenaphthene and benzaldehyde in the presence of an aqueous alcoholic solution of sodium hydroxide.

(8)

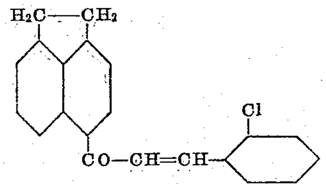

5-(2-chloro-cinnamoyl)-acenaphthene (F=113° C.), described by Fleischer and Wolff, "Berichte der Deutschen Chemischen Gesellschaft," 53rd annual publication (1920), page 926.

(9)

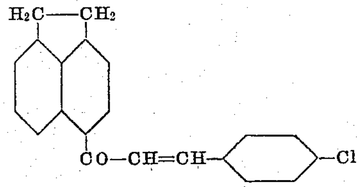

5-(4-chloro-cinnamoyl)-acenaphthene (F=135°–136° C.), obtainable from 5-acetyl-acenaphthene and 4-chloro-benzaldehyde in an alcoholic aqueous solution of sodium hydroxide.

(10)

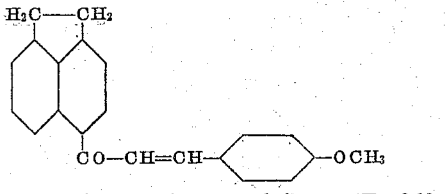

5-(4-methoxy-cinnamoyl)-acenaphthene (F=96°–98° C.), obtainable by condensation of an alcoholic solution of 5-acetyl-acenaphthene with anisaldehyde in the presence of alkali.

(11)

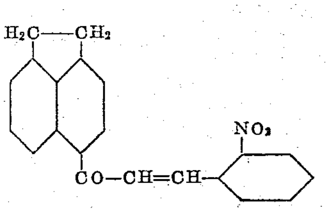

5-(2-nitro-cinnamoyl)-acenaphthene (F=160°–163° C.), obtainable by condensation of an alcoholic solution of 5-acetyl-acenaphthene with 2-nitro-benzaldehyde in the presence of alkali.

(12)

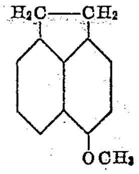

5-methoxy-acenaphthene (F=60° C.), obtainable from 5-hydroxy-acenaphthene by methylation with dimethyl sulfate in the presence of alkali.

The expression cinnamoyl is intended to cover the acyl residue of cinnamic acid, $C_6H_5CH{=}CH{-}CO$.

In accordance with this invention, a solution containing one of the acenaphthene derivatives is applied to a suitable base, e. g. a metal plate, preferably of aluminum, which may be provided with a roughened surface which may be formed mechanically or by providing a surface layer of aluminum oxide, produced either chemically or electrochemically. The solution may for example be applied by means of a plate-whirler. The coated base is then dried. In preparing the solutions, organic solvents, such as alcohols, dioxane, glycol-mono-methylether, pyridine, benzene, or mixtures of solvents can be used.

It is possible also to use mixtures of several acenaphthene compounds. The application of mixtures is especially advantageous if compounds are used which, by themselves, show a strong tendency to crystallize. In this case, mixtures of several acenaphthene compounds form a more uniform coating upon the base.

In order to produce printing plates from the light sensitive material thus obtained, the material may be exposed to light behind a master pattern. This exposure may, for instance, be performed with an arc lamp or a mercury lamp. During this operation the acenaphthene compounds, most of which are yellow in color, bleach at the places which are affected by the light to form an "imaged area." The areas of the material not exposed to light are hereinafter referred to as "non-imaged areas."

The printing plate produced in this way is treated with dilute acid, e. g. phosphoric acid, sulfuric acid, or nitric acid, preferably with a small addition of alcohol or of other organic solvents, such as acetone, methyl-ethyl-ketone and the like, and is subsequently rubbed in with greasy ink in the presence of a small quantity of water. Depending upon whether the "imaged areas" or the "non-imaged areas" are more readily removable by the development treatment, the ink adheres to those areas, which constitute the "printing image."

In this way if the "imaged areas" accept greasy ink and become "printing areas" then positive images and printing plates are obtained when using negative master patterns, or negative images and printing plates when using positive master patterns. However, if the non-imaged areas remain to accept the greasy ink and become the "printing areas" then positive images and positive printing plates are obtained when using positive patterns.

The light sensitive material produced in accordance with this invention can be stored in unexposed condition for some time at room temperature. If the light-sensitivity of the acenaphthene derivative used is very great and its stability is not quite satisfactory, as is the case, for instance, with 5-cinnamoyl-acenaphthene, the stability of the light sensitive layer can be improved by adding a polymerization inhibitor to the light sensitive layer. If, for instance, an aromatic hydroxyl compound, a quinone, or a dye of the thiazine series is added to the light sensitive layer, the time which the material can safely be stored in unexposed and dry condition at room temperature will be increased by several months. Effective polymerization inhibitors are, for example, phenols, such as hydroquinone, quinones, e. g. p-benzoquinone, p-toluquinone, and chloranil (2,3,5,6-tetra-chloro-benzoquinone-1,4), and dyes of the thiazine series, such as thionine (compare Schultz, "Farbstofftabellen," 7th edition (1931), volume 1, page 448, No. 1036), thionine blue G (same reference, page 452, No. 1042), methylene blue B (same reference, page 449, No. 1038), toluidine blue O (same reference, page 451, No. 1041), and similar dyes.

Addition of very small quantities of the polymerization inhibitors will do. In general, for example, approximately 0.1%, based on the amount of acenaphthene compound used, will suffice in most cases. The best procedure is to add the polymerization inhibitor to the coating solution which contains the light sensitive compound.

The following examples are inserted in order to illustrate the present invention:

(1) A solution of two parts of 6-nitro-5-benzoyl-acenaphthene (Formula 5) in one hundred parts of glycolmonomethyl-ether is applied to an aluminum plate, which may be mechanically roughened on its surface, and is then dried. The solution can be applied, for instance, by means of a plate whirler. The coated side of the dry material is exposed to light under a negative pattern (for approximately 8 minutes when using an 18 ampere arc lamp at a distance of 60 cm.), the exposed layer is then developed by wiping with a 5% phosphoric acid solution to which 5% of alcohol has been added, and the image is rubbed in with greasy ink. A positive image of the negative master pattern will appear, which can be used for printing as soon as the printing plate is mounted in an offset printing machine.

(2) The procedure described in Example 1 is followed except for the fact that a solution consisting of one part of 5-nitro-acenaphthene (Formula 1) and one part of 5-chloro-acenaphthene (Formula 2) in one hundred parts of alcohol is used for coating the aluminum foil. A positive image is finally obtained in this case also.

(3) An anodically oxidized aluminum foil is coated with a solution of two parts of 5-benzoyl-acenaphthene (Formula 4) in one hundred parts of a mixture containing equal parts of dioxane and alcohol. After the foil has been dried, it is exposed to light under a negative pattern and is subsequently developed by wiping with a three-percent solution of sulfuric acid or a three-percent solution of nitric acid containing a three-percent addition of methylethyl-ketone. The developed surface is rubbed in with greasy ink, and a positive printing plate is obtained from a negative master pattern.

(4) An aluminum plate is coated with a solution containing two parts of 5-acetyl-acenaphthene (Formula 3) and one part of 5-methoxy-acenaphthene (Formula 12) in one hundred parts of alcohol. The coated plate is then dried, exposed to light under a negative pattern, and developed by bathing for about one to two minutes in a 5% solution of acetic acid with an addition of 5% alcohol. The developed plate is rubbed in with ink and a positive printing plate is thus obtained.

(5) 2.5 parts of 5-acetyl-amino-acenaphthene (Formula 6) are dissolved in one hundred parts of glycolmonomethyl-ether and then the procedure described in Example 1 is followed. In this case, however, negative images are obtained from negative patterns and positive images from positive patterns.

(6) An aluminum foil is coated with a solution which is obtained by dissolving a mixture consisting of one part of 5-cinnamoyl-acenaphthene (Formula 7), one part of 5-(2-chloro-cinnamoyl)-acenaphthene (Formula 8), and 0.1 part of hydroquinone, in one hundred parts of a mixture consisting of dioxane and alcohol (1:1). The plate thus coated is dried and then exposed to light for one minute under a negative pattern. The plate is developed by wiping with a three-percent solution of phosphoric acid and is then rubbed in with greasy ink. Positive printing plates are obtained.

The addition of hydroquinone increases the stability of the light sensitive aluminum plate in unexposed condition.

(7) The procedure described in Example 6 is followed except for the fact that a solution of one part of 5-(4-methoxy-cinnamoyl)-acenaphthene (Formula 10), one part of 5-(4-chloro-cinnamoyl)-acenaphthene (Formula 9), and 0.1 part of p-toluquinone or 0.1 part of p-benzoquinone, in one hundred parts of glycol-mono-methyl-ether is used in coating the foil.

The addition of p-benzoquinone or p-toluquinone makes it possible to store the coated plates for many months in unexposed or dry condition at room temperature, while plates lacking such addition may become unserviceable after only a few days.

(8) One part of 5-(2-nitro-cinnamoyl)-acenaphthene (Formula 11), one part of 5-acetyl-acenaphthene (Formula 3), and 0.1 part of chloranil are dissolved in one hundred parts of alcohol. This solution is applied as a layer to an aluminum plate which is subsequently dried. The coated side is then exposed to light for two minutes under a negative master. The exposed plate is developed by wiping with a three-percent solution of phosphoric acid and subsequently rubbing in with ink. A positive printing plate is obtained in this manner. The addition of chloranil increases the stability of the unexposed light sensitive material.

(9) The procedure described in Example 8 is followed except for the fact that a solution of one part of 5-cinnamoyl-acenaphthene (Formula 7), one part of 5-(4-methoxy-cinnamoyl)-acenaphthene (Formula 10), and 0.1 part of methylene blue B or of thionine, in one hundred parts of alcohol is used in coating. The addition of these thiazine dyes increases the stability of the coated plate in unexposed condition.

Having thus described the invention, what is claimed is:

1. A presensitized lithographic printing plate for use in the graphic arts, comprising a sheet metal base support material coated with a thin uniform and continuous layer adhering to said support, said layer comprising a compound selected from the group consisting of those having one of the following general formulae:

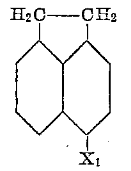

and

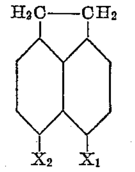

in which $X_1$ and $X_2$ stand for a member of the group consisting of halogen, nitro, alkoxy, acylated amino, and acyl residues of the general formula —CO—R in which R stands for a member of the group consisting of aromatic radical, an alkyl radical, an alkylene radical, an aromatically substituted alkyl radical, and an aromatically substituted alkylene radical.

2. The presensitized layer of claim 1, wherein said layer includes a polymerization inhibiting compound selected from the group consisting of aromatic hydroxyl compounds and thiazine dyes.

3. A presensitized lithographic printing plate for use in the graphic arts, comprising a thin flexible support material of aluminum coated with a thin uniform and continuous layer adhering to said support, said layer comprising a compound selected from the group consisting of those having one of the following general formulae:

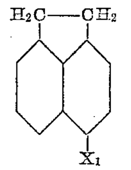

and

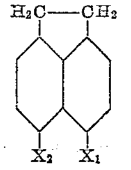

in which $X_1$ and $X_2$ stand for a member of the group consisting of halogen, nitro, alkoxy, acylated amino, and acyl residues of the general formula —CO—R, in which R stands for a member of the group consisting of an aromatic radical, an alkyl radical, an alkylene radical, an aromatically substituted alkyl radical, and an aromatically substituted alkylene radical.

4. The presensitized layer of claim 3, wherein said layer includes a polymerization inhibiting compound selected from the group consisting of aromatic hydroxyl compounds and thiazine dyes.

5. A presensitized lithographic printing plate for use in the graphic arts, comprising a thin, flexible sheet metal base support material coated with a thin uniform and continuous layer firmly adhering to said support, said layer essentially consisting of the compound having the formula

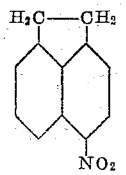

6. A presensitized lithographic printing plate for use in the graphic arts, comprising a thin, flexible sheet metal base support material coated with a thin uniform and continuous layer firmly adhering to said support, said layer essentially consisting of the compound having the formula

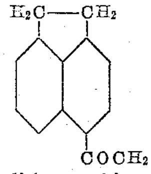

7. A presensitized lithographic printing plate for use in the graphic arts, comprising a thin, flexible sheet metal base support material coated with a thin uniform and continuous layer firmly adhering to said support, said layer essentially consisting of the compound having the formula

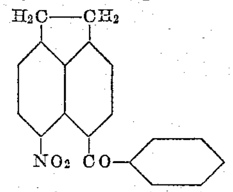

8. A presensitized lithographic printing plate for use in the graphic arts, comprising a thin, flexible sheet metal base support material coated with a thin uniform and continuous layer firmly adhering to said support, said layer essentially consisting of the compound having the formula

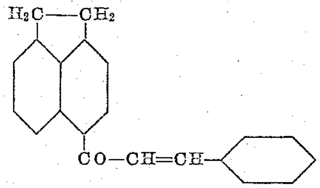

9. A presensitized lithographic printing plate for use in the graphic arts, comprising a thin, flexible sheet metal base support material coated with a thin uniform and continuous layer firmly adhering to said support, said layer essentially consisting of the compound having the formula

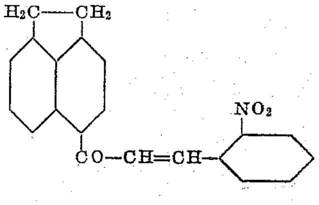

10. The method of producing printing plates, comprising the steps of coating a base support material with a thin uniform and continuous layer of a compound selected from the group consisting of those having one of the following general formulae:

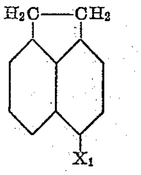

and

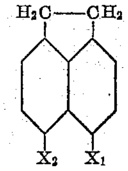

in which $X_1$ and $X_2$ stand for a member of the group consisting of halogen, nitro, alkoxy, acylated amino, and acyl residues of the general formula —CO—R, in which R stands for a member of the group consisting of an aromatic radical, an alkyl radical, an alkylene radical, an aromatically substituted alkyl radical, and an aromatically substituted alkylene radical, exposing said layer to a light image and treating said layer with a dilute acid.

11. A presensitized lithographic printing plate for use in the graphic arts, comprising a thin, flexible base support of aluminum coated with a thin uniform and continuous layer firmly adhering to said support, said layer including the compound having the formula

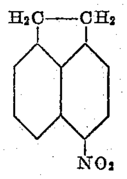

12. A presensitized lithographic printing plate for use in the graphic arts, comprising a thin, flexible base support of aluminum coated with a thin uniform and continuous layer firmly adhering to said support, said layer including the compound having the formula

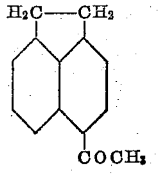

13. A presensitized lithographic printing plate for use in the graphic arts, comprising a thin, flexible base support of aluminum coated with a thin uniform and continuous layer firmly adhering to said support, said layer including the compound having the formula

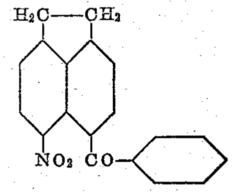

14. A presensitized lithographic printing plate for use in the graphic arts, comprising a thin, flexible base support of aluminum coated with a thin uniform and continuous layer firmly adhering to said support, said layer including the compound having the formula

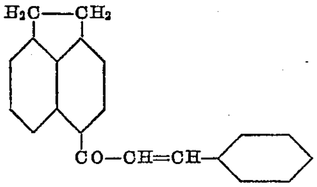

15. A presensitized lithographic printing plate for use in the graphic arts, comprising a thin, flexible base support of aluminum coated with a thin uniform and continuous layer firmly adhering to said support, said layer including the compound having the formula

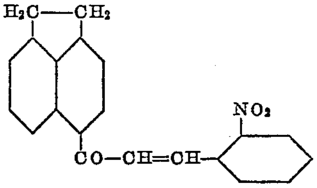

References Cited in the file of this patent

UNITED STATES PATENTS

| | | |
|---|---|---|
| 2,073,313 | Murray | Mar. 9, 1937 |
| 2,169,003 | Murray | Aug. 8, 1939 |
| 2,336,299 | Russell | Dec. 7, 1943 |
| 2,359,040 | Jorgensen | Sept. 26, 1944 |
| 2,448,861 | Colt | Sept. 7, 1948 |
| 2,610,120 | Minsk et al. | Sept. 9, 1952 |

OTHER REFERENCES

Sachs et al.: Berichte der Deutschen Chem. Ges. 44 (1911), page 2854. Copy in Scientific Library.

Fleischer and Wolff: Berichte der Deutschen Chem. Ges. 53 (1920), page 926.